UNITED STATES PATENT OFFICE.

CHARLES R. ERKENS, OF NEW YORK, N. Y., ASSIGNOR TO SIMPLEX ALUMINUM SOLDER COMPANY INC., OF NEW YORK, N. Y., A CORPORATION OF NEW YORK.

ALUMINUM-SOLDER.

1,033,565.  Specification of Letters Patent.  Patented July 23, 1912.

No Drawing.  Application filed May 2, 1912.  Serial No. 694,595.

*To all whom it may concern:*

Be it known that I, CHARLES R. ERKENS, a citizen of the United States, and a resident of the city of New York, borough of Manhattan, in the county and State of New York, have invented a new and Improved Aluminum-Solder, of which the following is a full, clear, and exact description.

This invention relates to an improved alloy to be used as a solder for uniting one strip or piece of aluminum to another, or for uniting one piece of aluminum to any other suitable metal.

Among the objects of this invention is to provide a solder of the class indicated which may be used for the purpose stated without requiring the heating of the parts to be united by a blow pipe or otherwise, and whereby the improved solder may be manipulated by the use of a common soldering iron in the hands of any one either skilled or unskilled in the soldering art, the process of applying this solder being even simpler than the process followed in the soldering of common tin ware.

From my extensive experience in the art to which this invention relates, I have found great difficulty in attempting to use any of the compositions of matter which have heretofore been proposed for soldering aluminum. Most of such compositions on the market depend for a principal ingredient the use of aluminum. Because of the natural properties of aluminum it is difficult and even many times impossible to form with it a perfect alloy with other metals, which accounts for the granular appearance of the solder when applied to the job. Again, it is neither desirable nor expedient, at least for a layman, to undertake to follow the directions in the use of an aluminum solder which requires that the parts to be joined must be heated, or which requires a blow pipe to apply the solder. Among the reasons for this objection is the fact that the application of heat is likely to carry with it an application of an impurity to the surfaces which are supposed to be substantially clean in order to provide a perfect union.

My method of preparing this aluminum solder consists essentially in melting or mixing together in suitable proportions the following metals or their equivalents: block tin, zinc, lead, antimony, bismuth, and chromium. The bismuth and chromium are metals having a high degree of fluidity when melted, and they or their equivalents are used for the purpose of making the solder run freely when being applied.

The foregoing metals may be of substantially commercial purity, and hence I am enabled through the process of formation herein described, to produce a satisfactory aluminum solder at such a low cost as to bring it within the reach of every householder. The proportions of the foregoing metals which I have found most suitable are as follows by weight:

60 parts block tin,
  15 " zinc,
  10 " lead,
  5 " antimony,
  5 " bismuth,
  5 " chromium.

100 parts.

When the above metals are melted and thoroughly mixed, I clean the same by introducing any suitable acid or oxidizing agent, the action of which is to separate all impurities from the molten alloy, and then I introduce a binding agent such as sulfur for the purpose of causing such impurities to hold together and to separate from the alloy as a dross to be skimmed or otherwise separated from the mass. I have found as a suitable oxidizing agent the use of thirty-five grams of salicylic acid and ten grams of calcium, to each five pounds of the above alloy. For a like amount of material I will use preferably as a binding agent about two drams of sulfur. I have found by careful experiment and analysis that about 5% of the oxidizing and cleansing agents used will be retained by the alloy which will serve to take the place of the acid or flux commonly used in the ordinary soldering process.

The proportions of the primary metals above indicated may be varied to a certain extent according to the degree of hardness of the product desired, and I, therefore, do not wish to be limited unnecessarily to the exact proportions or specific ingredients enumerated.

Having thus described my invention, what I claim as new and desire to secure by Letters Patent is:

1. The herein described method of making aluminum solder which comprises the melting together of block tin, zinc, antimony and a metal having a high degree of fluidity, adding to the molten alloy an oxidizing agent for cleansing purposes, and then further cleansing the alloy by a suitable binder for the impurities.

2. The herein described process of preparing an aluminum solder which comprises the melting together of suitable metal ingredients, adding to the molten alloy a certain quantity of salicylic acid and calcium as a cleansing agent, and then introducing a certain quantity of sulfur as a binding agent for the impurities, a small portion of the cleansing agent being retained in the alloy.

In testimony whereof I have signed my name to this specification in the presence of two subscribing witnesses.

CHAS. R. ERKENS.

Witnesses:
GEO. L. BEELER,
PHILIP D. ROLLHAUS.